Patented June 17, 1930

1,764,022

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

ESTERS OF PHTHALIC ACID

No Drawing.   Application filed May 19, 1928.   Serial No. 279,212.

This invention relates to esters of phthalic acid and to methods of preparing them.

Diamyl phthalates and diisoamyl phthalates have been prepared as pure compounds from phthalic acid and the pure alcohols. Recently a product has been put on the market bearing the trade name "Pentasol" which is the hydrolyzed or saponified product of the chlorinated pentane fraction recovered from natural gas. This product is a mixture of amyl alcohols in approximately the proportions of 26% normal amyl alcohol, 16% isoamyl alcohol, 32% 2-methyl butanol, 18% 1-methyl butanol, and 8% diethyl carbinol. In other words, the mixture contains five of the seven possible isomeric alcohols neglecting optical activity.

The present invention relates to the product of esterification of this mixture of amyl alcohols which will be referred to by its trade name, it being understood that the product is the mixture above defined, with phthalic acid or anhydride. A mixed ester product is obtained which however, does not, so far as has been determined, contain the isomeric esters in exactly the same proportions as the alcohols present in the original reaction mixture. The mixed esters obtained are valuable solvents and plasticizers for cellulose ester products, various aldehyde condensation resins, and the like. Their uniformly high boiling point and substantial inertness under the conditions of molding to which thermoplastics are subjected, render the product of great commercial importance.

While it is possible to esterify "Pentasol" and phthalic acid by the ordinary method using concentrated sulfuric acid, yields are poor and I have found it desirable to combine the esterification in the presence of sulfuric acid or a similar condensing agent with the removal of water by boiling with a liquid which forms with water an azeotropic mixture. In the past, one or the other of these methods has been used for esterifications but I find that for esterifying "Pentasol" with phthalic acid a combination of the two gives the best results and constitutes the preferred method. It is understood that I do not in this application claim use of this combined esterification method generally for all esters.

Example 1

125 parts of "Pentasol" and 100 parts of commercially pure phthalic anhydride are mixed with 2-6 parts of concentrated sulfuric acid and the mixture boiled under a reflux condenser for 6-8 hours. Thereupon the reaction mixture is poured into water, the ester layer washed with water, then with dilute alkali, then finally again with water and the ester is then separated and dried with calcium chloride or with anhydrous sodium sulfate and distilled at 10-20 mm. or lower pressure. Fair yields are obtained.

Example 2

A mixture similar to that described in Example 1 is boiled for 3-4 hours under a reflux condenser and a volume of xylene equal to the reaction mixture volume is added and the condenser changed from reflux to take-off. Xylene is then distilled off at the rate of 60 parts per hour and carries with it the water formed in the reaction and the excess unreacted alcohol. After removing the xylene the ester mixture is worked in the still as in Example 1.

Example 3

To a mixture of 10 kg. of phthalic anhydride and 14 liters of "Pentasol" is added 250-400 cc. of concentrated hydrochloric acid. This mixture is boiled from 4-5 hours under a reflux condenser and then 15 liters of a mixture of toluene and "Pentasol" is added. The toluene is slowly distilled, removing the water formed in the reaction together with much of the excess unreacted amyl alcohols. The mixture of the esters remaining in the still is washed, dried, and distilled in the usual manner. The yields are not quite as good as in Example 2 where the combined sulfuric acid and azeotropic mixture method is used.

The mixed amyl phthalates from any of the examples constitutes a slightly oily liquid of faint empyreumatic odor. It is colorless when distilled under a vacuum. Slight color and odor are shown by samples distilled at higher pressures. It is, therefore, reasonable to assume that the distilled product is not 100% pure ester although the impurities are too small in quantity to determine exactly. I have found that samples distilled at 10-20 mm. pressure are sufficiently colorless and odorless for use in lacquers. The boiling point range of the esters is about 190-205° C.

The amyl alcohols recovered from the mixed phthalates by saponification show a boiling point range of about 119-137° C., which proves that all of the alcohols have entered into the esterification, although not to the same extent, for the secondary alcohols appear to esterify less rapidly.

What is claimed as new is:

A mixture of amyl phthalates produced by esterifying "Pentasol" with a phthalic acid substance and having a boiling point range when purified by distillation under 10 mm. mercury of 190-205° C., the product being a colorless or slightly yellow liquid.

Signed at Pittsburgh, Pennsylvania, this 18th day of May, 1928.

ALPHONS O. JAEGER.